United States Patent
Mockenhaupt et al.

(10) Patent No.: US 11,668,396 B2
(45) Date of Patent: Jun. 6, 2023

(54) GASKET WITH AN ANTI-FRET COATING

(71) Applicant: Dana Automotive Systems Group, LLC, Maumee, OH (US)

(72) Inventors: Martin Mockenhaupt, Buffalo Grove, IL (US); Christopher M. Naylon, Chicago, IL (US); Ruben Rodriguez, Yorkville, IL (US); Jason Tyrus, Tinley Park, IL (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 317 days.

(21) Appl. No.: 16/942,505

(22) Filed: Jul. 29, 2020

(65) Prior Publication Data

US 2022/0034404 A1    Feb. 3, 2022

(51) Int. Cl.
*F16J 15/08*    (2006.01)
*F16J 15/10*    (2006.01)

(52) U.S. Cl.
CPC ......... *F16J 15/0825* (2013.01); *F16J 15/102* (2013.01); *F16J 2015/085* (2013.01); *F16J 2015/0856* (2013.01); *F16J 2015/0868* (2013.01)

(58) Field of Classification Search
CPC .. F16J 15/0825; F16J 15/102; F16J 2015/085; F16J 2015/0856; F16J 2015/0868
See application file for complete search history.

(56) References Cited

U.S. PATENT DOCUMENTS

| | | | | |
|---|---|---|---|---|
| 4,834,399 A | * | 5/1989 | Udagawa | F16J 15/0825 277/592 |
| 5,255,926 A | * | 10/1993 | Udagawa | F16J 15/123 277/595 |
| 5,277,434 A | * | 1/1994 | Kestly | F16J 15/0825 277/592 |
| 5,490,681 A | * | 2/1996 | Plunkett | F16J 15/0825 277/592 |
| 5,582,415 A | * | 12/1996 | Yoshida | F16J 15/0825 277/592 |
| 5,586,776 A | * | 12/1996 | Kubouchi | F16J 15/0825 277/595 |
| 5,938,208 A | * | 8/1999 | Yoshida | F16J 15/0825 277/592 |
| 6,550,782 B2 | * | 4/2003 | Okazaki | F16J 15/0818 277/592 |
| 6,676,134 B1 | * | 1/2004 | Wiegert | F16J 15/0825 277/593 |

(Continued)

*Primary Examiner* — Nicholas L Foster
(74) *Attorney, Agent, or Firm* — McCoy Russell LLP

(57) ABSTRACT

A gasket for a combustion chamber is provided. The gasket comprises an upper assembly including an upper combustion sealing section with a raised bead positioned between a first component and a second component adjacent to a combustion chamber and an upper fluid sealing section positioned between the first component and the second component at a location spaced away from the combustion chamber. The upper combustion sealing section includes an anti-fret coating on a metal layer, the upper fluid sealing section includes a synthetic rubber coating on a metal layer, and the upper combustion sealing section is greater in thickness than the upper fluid sealing section.

20 Claims, 7 Drawing Sheets

(56) References Cited

U.S. PATENT DOCUMENTS

| | | | |
|---|---|---|---|
| 6,779,801 B2* | 8/2004 | Grant-Acquah | F16J 15/122 |
| | | | 277/592 |
| 6,981,703 B2* | 1/2006 | Kinoshita | F16J 15/0818 |
| | | | 277/592 |
| 7,108,268 B2* | 9/2006 | Udagawa | F16J 15/0825 |
| | | | 277/593 |
| 7,290,770 B2* | 11/2007 | Kasuya | F16J 15/0825 |
| | | | 277/592 |
| 7,311,309 B2* | 12/2007 | Udagawa | F16J 15/0825 |
| | | | 277/592 |
| 7,726,662 B2* | 6/2010 | Foster | F16J 15/0825 |
| | | | 277/592 |
| 8,220,800 B2* | 7/2012 | Umehara | F16J 15/0825 |
| | | | 277/592 |
| 2004/0075219 A1* | 4/2004 | Grant-Acquah | F16J 15/0818 |
| | | | 277/592 |
| 2005/0134007 A1* | 6/2005 | Kinoshita | F16J 15/0818 |
| | | | 277/628 |
| 2008/0169615 A1* | 7/2008 | Umehara | F16J 15/0825 |
| | | | 277/592 |
| 2011/0101626 A1* | 5/2011 | Prehn | F16J 15/0825 |
| | | | 277/592 |
| 2022/0243815 A1* | 8/2022 | Zwick | F16J 15/0825 |

* cited by examiner

GASKET WITH AN ANTI-FRET COATING

FIELD

The present disclosure relates to a gasket for sealing a combustion chamber.

BACKGROUND

Gaskets are deployed as combustion seals to partition combustion chambers from external components such as water jackets or other fluidic components. For example, head gaskets are used in internal combustion engines to provide a robust seal between a cylinder head and block. The gaskets include steel which in some cases may be coated with a fluoroelastomer (FKM) material. However, the gaskets are exposed to relatively high temperatures as well as shear and axial loading due to combustion forces as well as thermal expansion/contraction of the engine. Gasket thermal degradation stems from the kinematic and thermal loadings. The FKM coating is particularly susceptible to relatively high temperatures. Surface pitting and then fatigue cracking of the gasket layers result from the high temperatures and internal stresses and motion experienced by the gasket. These gasket degradation issues are exacerbated in boosted engines due to the higher combustion pressures occurring in the cylinders during forced induction. Degraded head gaskets are costly to repair in engines, due in part to the extensive engine component disassembly needed to access and remove the gasket.

SUMMARY

To overcome at least some of the aforementioned challenges a gasket is provided. The gasket, in one example, includes an upper assembly comprising an upper combustion sealing section with a raised bead positioned between a first component and a second component adjacent to a combustion chamber. The gasket further includes an upper fluid sealing section positioned between the first component and the second component at a location spaced away from the combustion chamber. The upper combustion sealing section comprises an anti-fret coating on a metal layer. Additionally, the upper fluid sealing section comprises a synthetic rubber coating on a metal layer. The upper combustion sealing section is greater in thickness than the upper fluid sealing section. In this way, sections of the gasket adjacent to the combustion chamber are more resistant to thermal and kinematic degradation than previous gasket designs. Put another way, the gasket's combustion and fluid sealing features are decoupled to more granularly tune the gasket's properties to suit the variation in expected stresses on the gasket during use. Gasket durability is consequently increased.

In another example, a stepped interface is formed at adjoining edges of the upper combustion sealing section and the upper fluid sealing section. The stepped interface provides a stopper effect to the upper combustion sealing section by increasing compressive load and reducing vertical motion that can degrade the gasket's bead. Consequently, the gasket's durability is further increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2 and 17-18 are drawn approximately to scale. However, other relative dimensions may be used, in other embodiments.

DETAILED DESCRIPTION

Embodiments of a gasket decoupling a fluid sealing section and a combustion sealing section are provided. The coatings applied to metal portions (e.g., multi-layered steel (MLS)) of a fluid sealing section and a combustion sealing section are selected to tune the gasket's resistance to degradation (e.g., surface fretting, fatigue cracking, and the like). This tuning is achieved in practice through the application of an anti-fret coating to a gasket section near a combustion chamber and the application of a synthetic rubber coating (e.g., fluoroelastomeric material) to a gasket section near passages of a liquid cooling arrangement. The anti-fret coating is more resistant to the higher temperatures and kinematic loading experienced by the section of the gasket near the combustion chamber in comparison to the synthetic rubber coating. The material characteristics in different locations of the gasket therefore complement the expected operating conditions (e.g., thermal and kinematic stresses) in these sections. Gasket durability and lifespan are as a result increased. Additionally, the gasket section thickness with the anti-fret coating is made larger than the section with the synthetic rubber coating to provide a space efficient step stopper arrangement to increase compressive load and reduce vertical motion which can lead to gasket cracking. This step stopper arrangement further increases gasket durability. Providing the thicker combustion sealing section, enables the gasket to forgo a shim, in some embodiments, resulting in simplified gasket construction.

Figure 1:
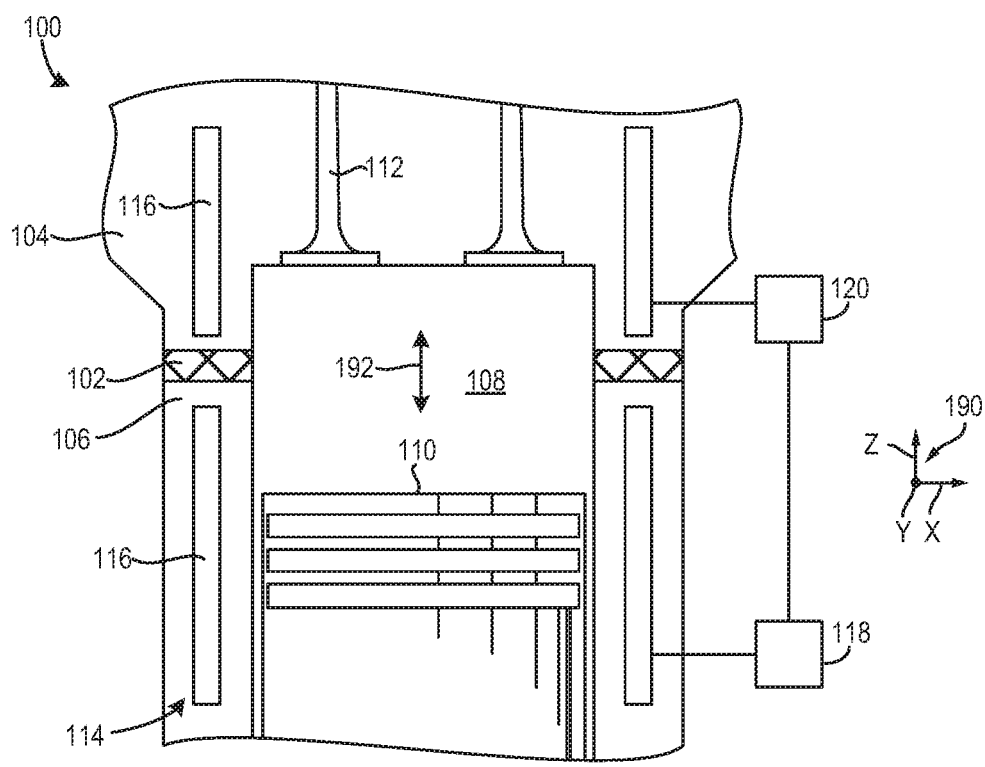
FIG. 1 is a high-level illustration of a combustion chamber with a gasket.

FIG. 1 shows an illustration of an internal combustion engine 100 with a gasket 102 positioned between two components. Specifically, in the illustrated embodiment, the gasket 102 is interposed between a cylinder head 104 and a cylinder block 106 of the engine 100. As such in the illustrated example, the gasket may be referred to as a head gasket. As such, in one use-case example the engine may be included in a vehicle. However, in other embodiments, the gasket may be arranged between other suitable components, where sealing therebetween is desired. For instance, the gasket may be arranged in a generator or a turbine engine, in other use-case examples.

A combustion chamber 108 is formed in the cylinder block 106 and head 104 with a piston 110 disposed therein. Intake and exhaust valves 112 are provided in the cylinder head 104 to enable combustion cycles (e.g., four-stroke combustion cycles) to take place therein. The engine 100 may include other conventional components for carrying out combustion operation such as an intake system, an exhaust system, a fuel delivery system, an emission control system, etc., as is known in the art.

The engine 100 also includes a water jacket 114 with coolant passages 116 allowing for thermal exchange and engine temperature control. The water jacket 114, in the illustrated embodiment, comprises coolant passages in the cylinder block 106 and the cylinder head 104. The water jacket 114 may be included in a cooling system comprising a pump 118, a heat exchanger 120, and other conventional components such as valves, coolant conduits, etc. The pump 118 is designed to circulate coolant (e.g., water, a mixture of water and glycol, and the like) through the water jacket 114 and therefore may include conventional components such as a plunger, rotor, chambers, valves, etc. The heat exchanger 120 is designed to remove heat from the coolant flowing therethrough and may also include conventional components such as coolant passages, heat fins, a housing, etc. It will also be understood that the engine 100 may further include a lubrication system providing a lubricant (e.g., oil) to the piston 110 and/or other components in the engine. As such, the gasket 102 may include openings for oil feed and drain-back passages.

The gasket 102 is designed to seal both the combustion chamber 108 and the water jacket 114. Thus, the gasket 102 may substantially prevent unwanted escape of combustion gases, fuel, oil, etc. from the combustion chamber 108 and unwanted escape of coolant from the water jacket 114. Therefore, the gasket 102 allows the likelihood of unwanted mixing of the combustion gases, oil, etc., and the coolant in the water jacket to be substantially reduced. The gasket 102 is formed in different sections tailored to seal the combustion chamber 108 and the water jacket 114 and endure the localized temperatures and loading in each of these regions. Generally, the gasket 102 includes sections with steel cores (e.g., multi-layered steel (MLS) cores) and coatings applied to the cores. The material construction of the gasket 102 is further described herein with regard to FIG. 2-19.

An axis system 190 is also provided in FIG. 1 as well as FIGS. 2-19 for reference. In one example, the z-axis may be parallel to a vertical axis (e.g., gravitational axis), the x-axis may be a lateral axis, and the y-axis may be a longitudinal axis. However, other orientations of the axes may be used, in other examples. A central axis 192 of the combustion chamber 108 is also provided in FIG. 1, for reference.

Figure 2:
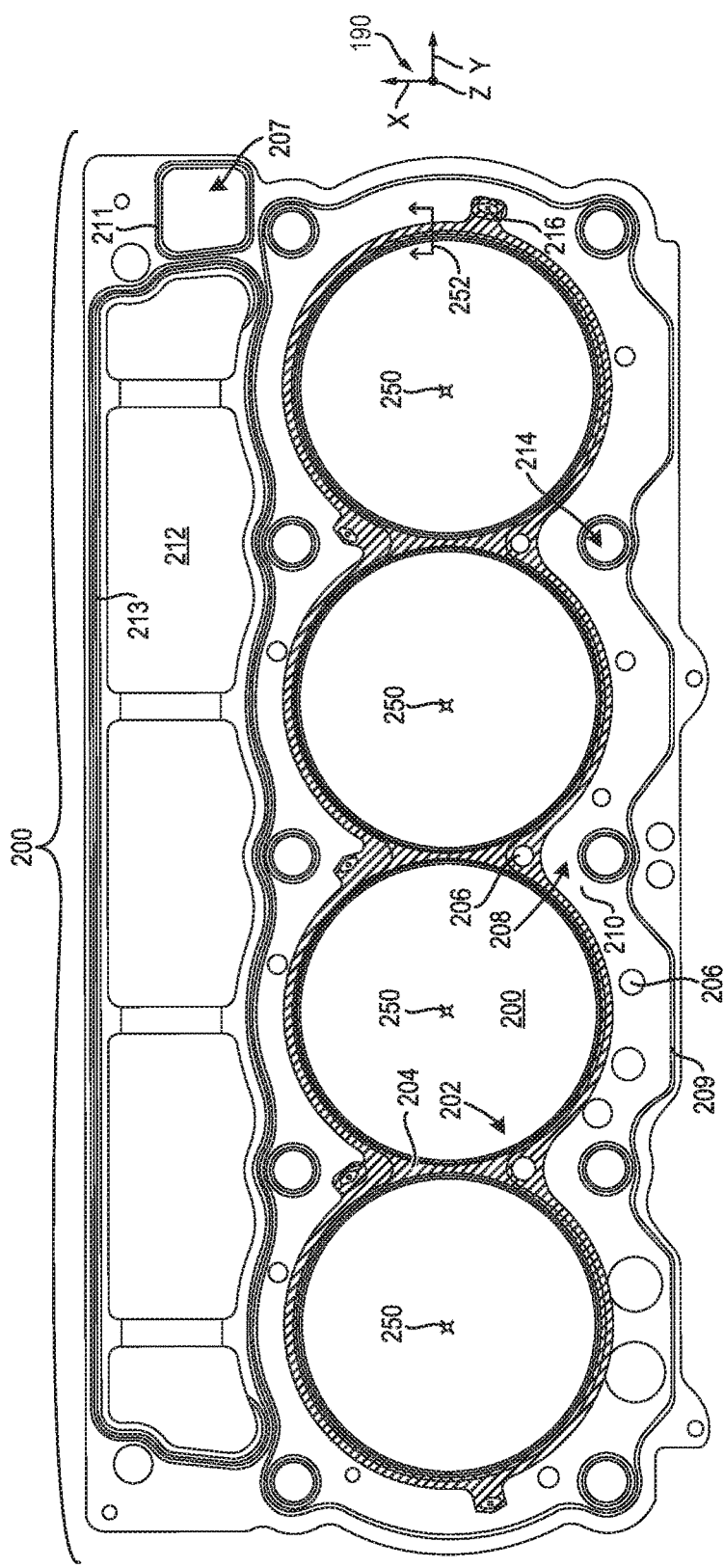
FIG. 2 is an illustration of a first example of a head gasket.

FIG. 2 shows a head gasket 200 with cylinder bores 201. Central axes 250 of the bores and the combustion chambers, correspondingly, are provided for reference. It will be appreciated that the head gasket 200 shown in FIG. 2 is an example of the head gasket 102, shown in FIG. 1 and therefore may be positioned between two components (e.g., the cylinder head 104 and the cylinder block 106, illustrated in FIG. 1). FIG. 2 specifically illustrates a gasket for a four-cylinder engine bank, though other embodiments may contain other amounts of cylinder bores (e.g., less than four, more than four, etc.).

A combustion sealing section 202 is formed adjacent to the cylinder bores 201. The combustion sealing section 202 is specifically shown extending circumferentially around the cylinder bores 201. However, combustion sealing sections only partially circumferentially extending around the cylinder bores, have been envisioned. The combustion sealing section 202 therefore functions to reduce the chance of combustion gasses, fluids, etc., leaking from the combustion chamber when the gasket is installed in an engine or other suitable device with a combustion chamber. As discussed in greater detail herein, the combustion sealing section may include an upper section and, in some cases, a lower section.

The combustion sealing section 202 includes an anti-fret coating 204 designed to withstand higher temperatures and the kinematic loads experienced during combustion operation in relation to other gasket sections. The anti-fret coating specifically reduces the chance of gasket degradation (e.g., surface corrosion, bead cracking from elevated internal stresses induced by surface fretting and vertical motion, etc.), for instance. Engine longevity is increased, as a result.

There may be several other types of openings in the head gasket 200 for other purposes, one type being water jacket openings 206 for the routing of coolant (e.g., water, a mixture of water and glycol, etc.) in engine cooling systems. The water jacket openings 206 may therefore serve as cross-over passages from the cylinder block (e.g., cylinder block 106, shown in FIG. 1) to the cylinder head (e.g., cylinder head 104, shown in FIG. 1) or vice versa. A fluid sealing section 208 is provided in the head gasket 200 for sealing the water jacket openings 206. Thus, the fluid sealing section 208 may circumferentially or partially circumferentially extend around the water jacket openings 206. Thus, the fluid sealing section 208 is arranged near the water jacket passages, thereby sealing water jacket passages. In this way, the likelihood of the working fluid in the water jacket leaking into the combustion chamber is decreased.

In the illustrated example, a group of the water jacket openings 206 includes openings near the cylinder bores 200 with a perimeter seal 209 extending around the group. One of the water jacket openings, indicated at 207, is shown positioned external to the perimeter seal with an island type seal 211 extending circumferentially around the opening. However, other sealing arrangements for the water jacket openings have been contemplated.

The fluid sealing section 208 includes a synthetic rubber coating 210. The synthetic rubber functions to drive down the chance of fluid leakage. It will also be appreciated that the fluid sealing section 208 may be partitioned into upper and lower portions, similar to the combustion sealing section 202. Furthermore, the combustion sealing section 202 and the fluid sealing section 208 may be physically decoupled, thereby increasing gasket durability and in some cases decreasing manufacturing costs due to the tailored types of coatings used in each section. Thus, the decoupling allows the material properties of the sections to be granularly tuned to achieve variances in durability against localized forces and temperatures, corresponding to expected operating conditions of the sections. The types of gasket coatings are expanded upon herein with regard to FIG. 3.

The head gasket 200 may also include lubricant (e.g., oil) openings 212 (e.g., feed and drain-back openings). Additionally, a perimeter seal 213 is shown extending around the lubricant openings 212. However, different sealing arrangements may be used in other examples. For instance, at least one of the lubricant openings may have an island type seal extending around the opening.

The head gasket 200 may further include bolt holes 214, for mounting the head gasket 200 to an engine block and cylinder head (e.g., the cylinder block 106 and cylinder head 104, depicted in FIG. 1). As such, bolts may extend through the holes 214, during gasket installation to axially compress the gasket. Therefore, it will be understood that the head gasket 200 as well as the other gaskets described herein may be interposed between a cylinder head and block, when installed. In the illustrated embodiment, the gasket 200 includes ten bolt holes with two set of holes arranged on opposing sides of the cylinder bores 200. To elaborate, each of the sets of bolt holes are aligned along an axis parallel to the y-axis, in the illustrated embodiment. However, other bolt hole patterns and/or a varied number of bolt holes may be used in alternate embodiments. The layout and number of bolt holes may be determined based on factors such as cylinder arrangement, gasket compressive load targets, water jacket profile, lubrication passage arrangement, etc.

Figure 3:
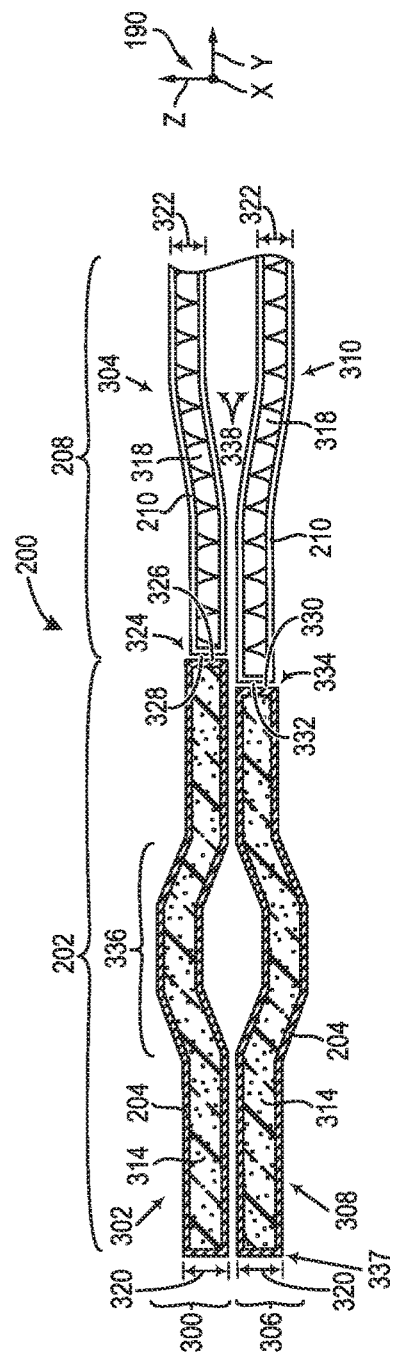
FIG. 3 is a cross-sectional view of the head gasket, depicted in FIG. 2.

The combustion sealing section 202 and the fluid sealing section 208 may be coupled to one another via an attachment interface 216 (e.g., eyelet). In this way, the sections retain a desired relative position during installation and assembly. However, in other examples the gasket sections may not be attached to one another, which may however complicate gasket installation and assembly procedures. A cutting plane 252 indicating the location of the cross-sectional view of FIG. 3 is also provided in FIG. 2. It will also be appreciated, that the other cross-sections depicted herein may be at a similar location in the corresponding gasket. However, it will also be appreciated that the gaskets may also have similar cross-sections elsewhere.

FIG. 3 shows a cross-sectional view of a section of a head gasket 200 with the combustion sealing section 202 and the fluid sealing section 208. The head gasket 200 specifically comprises an upper assembly 300 with an upper combustion sealing section 302 and an upper fluid sealing section 304. The head gasket 200 also includes a lower assembly 306 containing a lower combustion sealing section 308 and lower fluid sealing section 310. However, in other embodiments, the gasket may include one assembly with a combustion and fluid sealing section. The combustion sealing sections are configured to provide component sealing adjacent to a combustion chamber, as previously discussed. The descriptors "upper" and "lower" refer to relative positions of components, devices, sections, etc., along the z-axis. As such, in the frame of reference of the page, the "upper" descriptor denotes that a component, section, etc., is closer to the top of the page while the "lower" descriptor denotes that a component, section, etc., is closer to the bottom of the page. In some examples, the z-axis may be aligned with a gravitational axis, while in others these axes may not be aligned.

The combustion sealing sections 302, 308 each include the anti-fret coating 204 around a metal core 314. Specifically, as depicted in FIG. 3, the anti-fret coating 204 is deposited on upper, lower, and lateral side surfaces of the metal core 314, in the illustrated embodiment. However, in other embodiments, the anti-fret coating 204 may be omitted from the lateral side surfaces. Whereas the fluid sealing sections 304, 310 each include the synthetic rubber coating 210 around a metal core 318. Again, the synthetic rubber coating 210 may be deposited on upper and lower surfaces of the metal core 318 as well as, in some cases, lateral side surfaces of the second metal core 318. Each of the metal cores 314, 318 may, in one example, include layers of steels (multi-layered steel (MLS)). However, other suitable metal core materials have been envisioned such as a metal core including copper. The MLS core is a less costly option than the copper, however.

The upper and lower combustion sealing sections 302, 308 may be thicker than the upper and lower fluid sealing sections 304, 310. Thicknesses of the combustion sealing sections are indicated at 320 and thicknesses of fluid sealing sections are indicated at 322. In one use case example, the thickness of each of the fluid sealing sections may be approximately 0.2 millimeters (mm) and the thickness of each of the combustion sealing sections may be approximately 0.25 mm. Thus, the entire combustion sealing section (upper and lower sections) may be 0.1 mm thicker than the fluid sealing section (upper and lower sections), in this use-case example. However, the combustion and fluid sealing sections may have other thicknesses. Additionally, the thicknesses of the combustion sealing sections and the fluid sealing sections may each be substantially constant along their respective lengths, in one example. However, in another example, the thicknesses of the combustion sealing sections may vary along their lengths and/or the thicknesses of the fluid sealing sections vary along their lengths. Furthermore, the thicknesses of the upper and lower combustion sealing sections 302, 308 are substantially equivalent, in the illustrated embodiment. Additionally, the thicknesses of the upper and lower fluid sealing sections 304, 310 are substantially equivalent, in the illustrated embodiments. However, alternatively, the upper and lower combustion sealing sections may vary in thickness with respect to one another and/or the upper and lower fluid sealing sections may vary in thickness with respect to each other.

Providing thicker combustion sealing sections in relation to the fluid sealing sections increases gasket durability. To elaborate, the varying thicknesses in the gasket sections provides a stopper effect by increasing compressive load and reducing vertical motion that creates cracks in the gasket's embossments. As such, stepped interfaces may therefore be formed where sections of the combustion sealing sections and the fluid sealing sections 304, 310 meet. Specifically, in the illustrated example, a stepped interface 324 is formed at adjoining edges 326, 328 of the upper combustion sealing section 302 and the upper fluid sealing section 304, respectively. Correspondingly, a stepped interface 334 is also formed at adjoining edges 330, 332 of the lower combustion sealing section 308 and the lower fluid sealing section 310, respectively. The stepped interface 324 is longitudinally offset from the stepped interface 334, in the illustrated example. However, other stepped interface arrangements have been envisioned, such as interfaces which are substantially aligned along an axis parallel to the z-axis. The stepped interface provides a stopper style effect, as noted above. Additionally, in the illustrated embodiment, the stepped interfaces 324, 334 may be formed without a shim stopper, thereby reducing gasket manufacturing costs. However, gasket arrangements with a shim stopper in the combustion sealing section of the upper assembly may be used, in alternate embodiments.

As previously mentioned, the upper and lower combustion sealing sections 302, 308 include the anti-fret coating 204. The anti-fret coating on the upper and lower combustion sealing sections may therefore be similar. However, in other examples, the materials used in the anti-fret coatings for the upper and lower combustion sealing sections may vary, which may increase production costs, in some cases.

The material(s) used in the anti-fret coating 204 may be designed with high durability to endure wear from thermal stress, compressive loads, and vertical and lateral motion that may cause fretting and bead cracking. The anti-fret coating 204 may include a ceramic material with additives such as polytetrafluoroethylene (PTFE), molybdenum disulfide, boron, combinations thereof, etc., in one example. In another example, the anti-fret coating 204 may be a plating including nickel and/or PTFE. For instance, the nickel plating may include nickel, nickel and PTFE, or nickel boron. Other examples could have a polymer base with additives such as boron, PTFE, molybdenum disulfide, etc., for the anti-fret coating 204. Further in one example, the anti-fret coating 204 may include a polymer which may be approximately seven microns thick. It will therefore be appreciated that the thickness of the anti-fret and synthetic rubber coatings are not drawn to scale. Further still, in some examples, the anti-fret coating may include a combination of the plating and ceramic material or the anti-fret coating may include the ceramic and polymeric materials.

The synthetic rubber coating 210 of the fluid sealing sections 304, 310 may be a fluoroelastomer. Various types of fluoroelastomers have been contemplated such as a fluorocarbon rubber (FKM). FKM may exhibit thermal degradation at temperatures over approximately 220°, in some instances. Therefore, the FKM material may provide a robust fluid seal at locations in the gasket spaced further away from the combustion chamber during use. The synthetic rubber coating may additionally or alternatively include fluorosilicone rubber, neoprene, nitrile rubber (NBR), etc. Cost reductions for manufacturing the head gasket 200 may be achieved by using these less temperature resistant and durable materials in the fluid sealing sections 304, 310 due to those areas seeing lower temperatures and loads. Thus, it will also be appreciated that the synthetic rubber may also be less expensive than the anti-fret coating, in some instances, thereby reducing manufacturing costs.

Additionally, the combustion sealing sections 302, 308 has segments which extend away from other portions of the gasket, known as a raised bead 336. Once installed, the raised bead compresses to provide a robust seal. To elaborate, the raised bead 336 may form a perimeter type seal extending around multiple cylinder bores, in one example. However, in other examples, the raised bead 336 may form an island type seal extending around one cylinder bore. The raised bead 336 is shown spaced away from interior edges 337 of the combustion sealing sections 302, 308. The fluid sealing sections 304, 310 are also shown extending away from one another at raised segments 338. However, other profiles of the combustion and fluid sealing sections have been contemplated.

FIGS. 4-16 depict a variety of examples of a gasket in cross-section. Specifically, FIGS. 4-10 illustrate gaskets with spacers and FIGS. 11-16 conversely illustrate gaskets without spacers. The gaskets include combustion sealing sections and fluid sealing sections with anti-fret coatings and synthetic rubber coatings, respectively. It will be understood that the material construction of the different coatings and sections in the gaskets depicted in FIGS. 4-16 may be similar to the combustion and fluid sealing sections and corresponding coatings described above with regard to FIGS. 2-3. Furthermore, the combustion sealing sections shown in FIGS. 4-16 have a greater thickness than their corresponding fluid sealing sections, similar to combustion and fluid sealing sections depicted in FIG. 3. As such, redundant description of these features is omitted for brevity.

Figure 4:
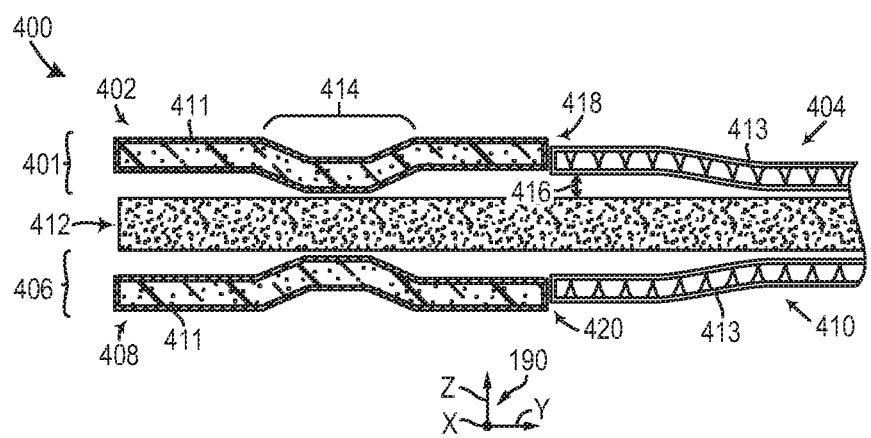
FIGS. 4-10 are cross-sectional illustrations of different configurations of a gasket with a spacer positioned between upper and lower assemblies.

Turning to FIG. 4, showing a gasket 400 which includes an upper assembly 401 with an upper combustion sealing section 402 and an upper fluid sealing section 404. The gasket 400 in this example also includes a lower assembly 406 with a lower combustion sealing section 408 and a lower fluid sealing section 410. The combustion sealing sections with the anti-fret coating 411 and the fluid sealing sections have the synthetic rubber coating 413. The gasket 400 may also include a spacer 412 positioned between the upper assembly 401 and the lower assembly 406. The spacer 412 allows the thickness of the gasket 400 to be increased to suit end-use design goals. The spacer 412 may be constructed out of metal (e.g., steel, copper, etc.) or other suitable materials such as composite materials. The gasket 400 may also include raised beads 414 in the upper and lower combustion sealing sections 402, 404. As depicted in FIG. 4, the raised beads 414 are adjacent to the spacer 412. As such, the raised beads 414 extend towards one another in a direction parallel to the z-axis. Providing raised beads with this configuration may provide a more robust seal in certain engine arrangements.

Gaskets with island type bead routing as well as perimeter type bead routing have been envisioned, as previously discussed. As such, the gaskets described herein may have island type bead routing and/or perimeter type bead routing, in different examples. In the island type bead routing embodiment, a bead is placed around a single port opening. On the other hand, in the perimeter type bead routing embodiment, the bead extends around a group of port openings (e.g., all of the port openings). Generally, island type bead routing may have a greater linear length to achieve sealing targets. However, in certain situations, decreasing bead length may be a design goal in some gaskets. It will be understood that the bead acts as a spring. Thus, beads with greater spring constants will need more bolt load to compress the bead. In some instances, the system may have a set available bolt load and the application of increased unit load may be desirable. As such, shorter routing of the gasket's bead allows the unit load to be increased.

In the illustrated embodiment, the fluid sealing sections 404, 410 are spaced away from the spacer 412 such that a gap 416 is formed therebetween near the combustion sealing sections and then progress closer to each other in a direction extending away from the combustion sealing sections. Stepped interfaces 418, 420 are again formed between the combustion sealing sections 402, 408 and the fluid sealing sections 404, 410.

Figure 5:
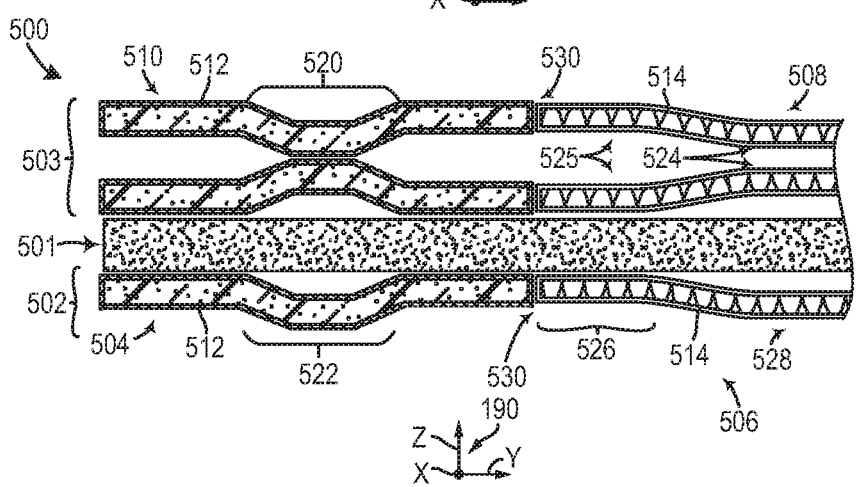

FIG. 5 illustrates another side view of a head gasket 500 with a spacer 501 between a lower assembly 502 and an upper assembly 503. The lower assembly 502 again includes a lower combustion sealing section 504 and a lower fluid sealing section 506. As shown, the upper assembly 503 may include two fluid sealing sections 508 and two combustion sealing sections 510. In this way, the upper assembly includes multiple layers in both the combustion and fluid sealing sections. Using additional layers in the gasket 500 may allow the gasket to achieve a more robust seal when installed but also increases gasket complexity. FIG. 5 also illustrates the combustion sealing sections with an anti-fret coating 512 and the fluid sealing sections with a synthetic rubber coating 514.

As shown in FIG. 5, raised beads 520 in the two upper combustion sealing sections 510 extend toward each other. However, other raised bead configurations are possible. Furthermore, one of the raised beads 520 of the upper combustion sealing sections 510 and a raised bead 522 in the lower combustion sealing section 504 extend away from the spacer 501. The two upper fluid sealing sections 508 may also include portions 524 extending alongside one another and portions 525 spaced away from one another. Additionally, the lower fluid sealing section 506 may include a first portion 526 closer to the spacer 501 and a second portion 528 further away from the spacer 501. Thus, the fluid and combustion sealing sections are aligned such that stepped interfaces 530 are formed at respective edges of the sections. However, in alternate embodiments, some of the combustion and fluid sealing sections may not line up to form the stepped interfaces.

Figure 6:
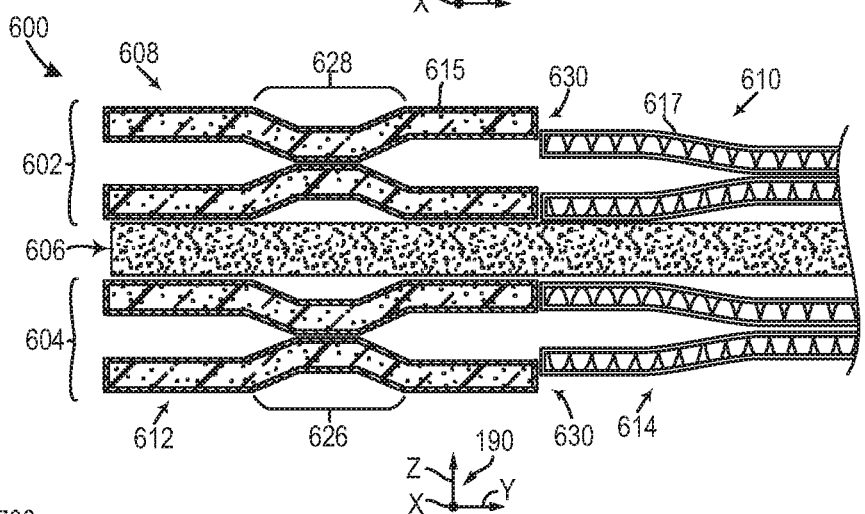

FIG. 6 displays a head gasket 600 with an upper assembly 602 and a lower assembly 604 with a spacer 606 therebetween. The upper assembly 602 may include two layered combustion sealing sections 608 and two layered fluid sealing sections 610. Likewise, the lower assembly 604 may include two combustion sealing sections 612 and two fluid sealing sections 614. An anti-fret coating 615 and a synthetic rubber coating 617 are again included on the combustion and fluid sealing sections, respectively. In the gasket 600 depicted in FIG. 6, raised beads 626 in the lower assembly 604 extend towards one another similar to raised beads 628 in the upper assembly 602. The fluid sealing sections 610, 614 are again aligned with corresponding combustion sealing sections to form stepped interfaces 630.

Figure 7:
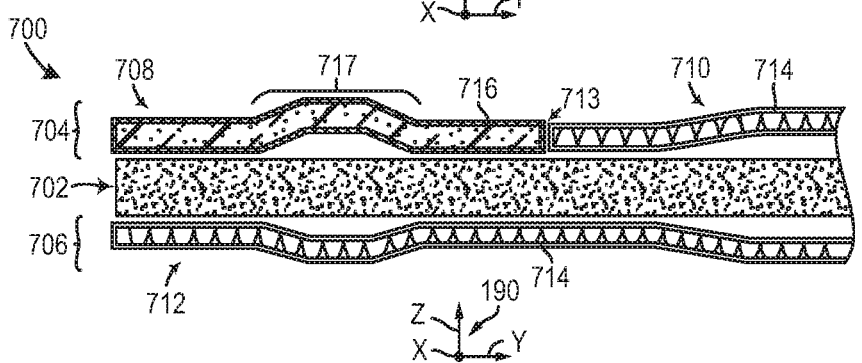

FIG. 7 shows yet another example of the head gasket 700 with a spacer 702 between an upper assembly 704 and a lower assembly 706. The upper assembly 704 again includes a combustion sealing section 708 and a fluid sealing section 710. However, the lower assembly 706 includes continuous sealing section 712 which may seal both a combustion chamber and water jacket passages. The sealing section 712 is thinner than the combustion sealing section 708. Thus, the upper assembly includes a stepped interface 713 while the lower assembly does not. Additionally, each the fluid sealing section 710 and the sealing section 712 include a synthetic rubber coating 714 while the combustion sealing section 708 includes an anti-fret coating 716. The depicted combustion sealing section 708 has a raised bead 717 extending away from the spacer 702.

Figure 8:
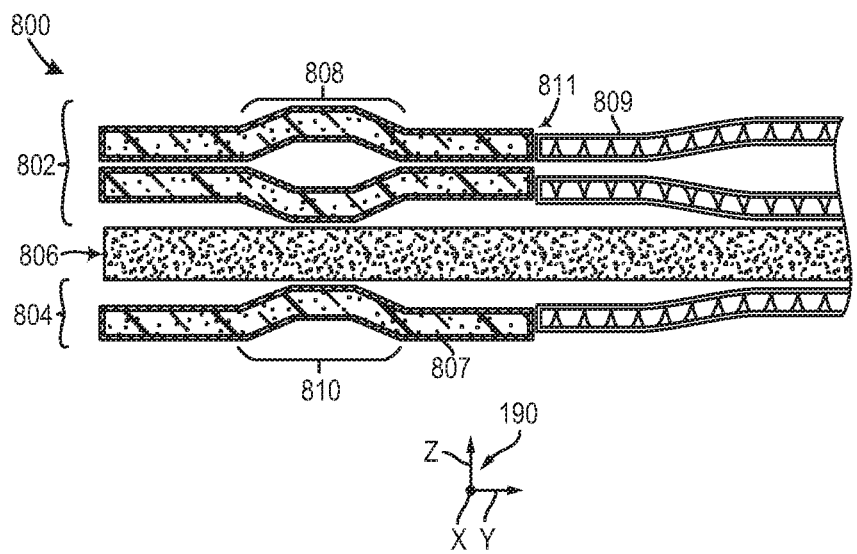

FIG. 8 illustrates another example of a head gasket 800 which may comprise an upper assembly 802 and a lower assembly 804 with a spacer 806 therebetween. Again, an anti-fret coating 807 is applied to combustion sealing sections in the gasket 800 and a synthetic rubber coating 809 is applied to fluid sealing sections and stepped interfaces 811 are formed between the combustion and fluid sealing sections. In this particular example, raised beads 808 in the upper assembly 802 extend away from one another while a raised bead 810 in the lower assembly 804 extends away from the spacer 806.

Figure 9:
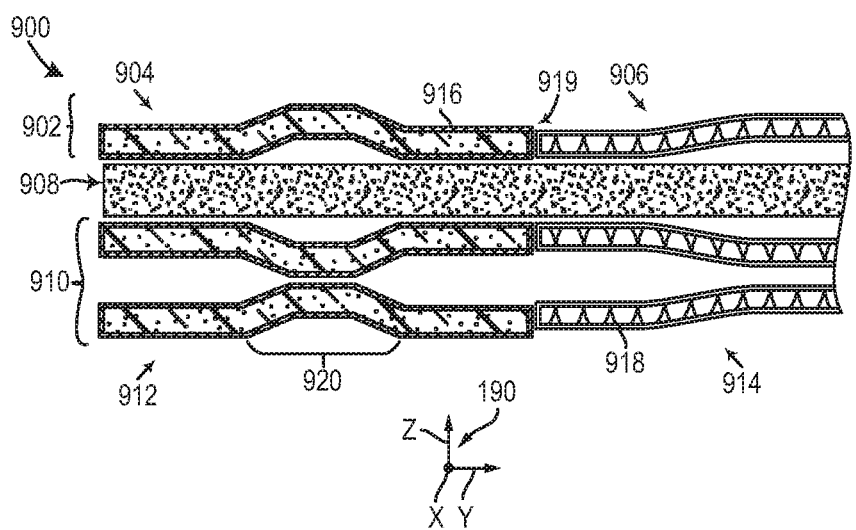

Moving to FIG. 9, another example of a head gasket 900 is shown. In the illustrated configuration the gasket 900 includes an upper assembly 902 with one upper combustion sealing section 904 and one upper fluid sealing section 906 running atop the spacer 908. Below the spacer 908 is a lower assembly 910 having two combustion sealing sections 912 and two fluid sealing sections 914. FIG. 9 also again illustrates the combustion sealing sections with an anti-fret coating 916 and the fluid sealing sections with a synthetic rubber coating 918 and stepped interfaces 919. In FIG. 9, raised beads 920 in the lower assembly 910 extend toward each other. However, other gasket arrangements have been contemplated.

Figure 10:
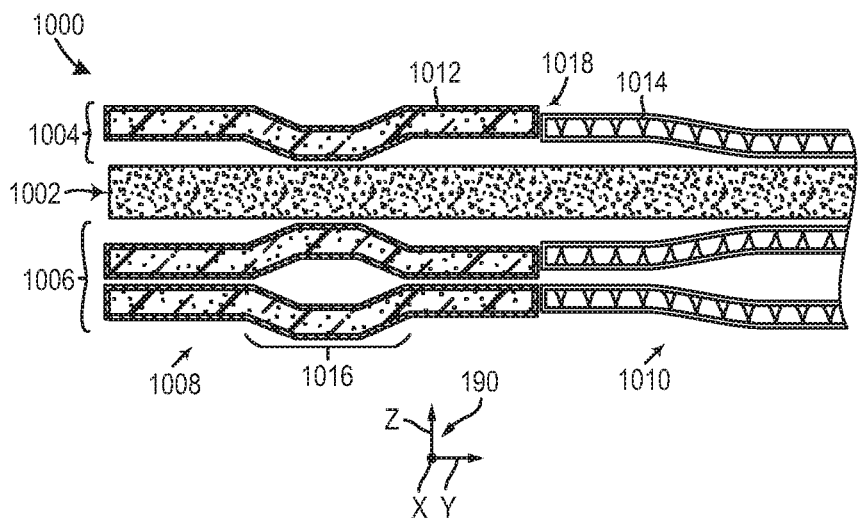

FIG. 10 shows another example of a head gasket 1000 with a spacer 1002 between an upper assembly 1004 and a lower assembly 1006. The lower assembly 1006 includes two combustion sealing sections 1008 and two fluid sealing sections 1010. The gasket 1000 again includes an anti-fret coating 1012 on the combustion sealing sections and a synthetic rubber coating 1014 on the fluid sealing sections. Beads 1016 in the lower assembly 1006 are shown extending away from one another and the gasket again includes stepped interfaces 1018. However, other gasket configurations may be used.

Figure 11:
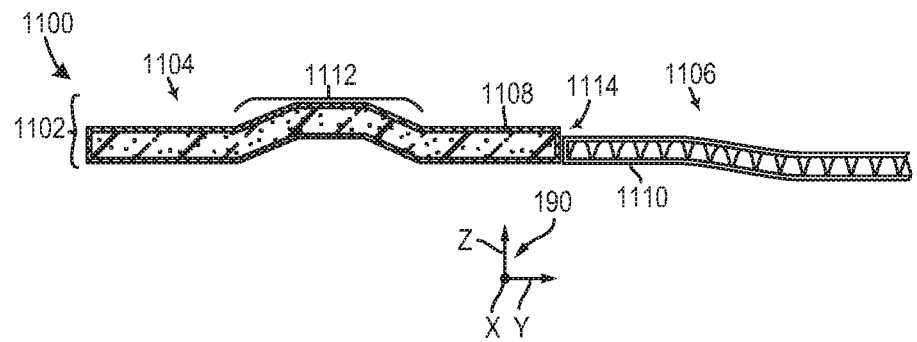
FIGS. 11-16 are cross-sectional illustrations of different configurations of a gasket without a spacer between upper and lower assemblies.

Turning to FIG. 11, a head gasket 1100 is illustrated with one assembly 1102 having a combustion sealing section 1104 a fluid sealing section 1106 with an anti-fret coating 1108 and a synthetic rubber coating 1110, respectively. FIG. 11 also includes one raised bead 1112 and stepped interface 1114 with the raised bead extending upward, to increase gasket durability and sealing capabilities.

Figure 12:
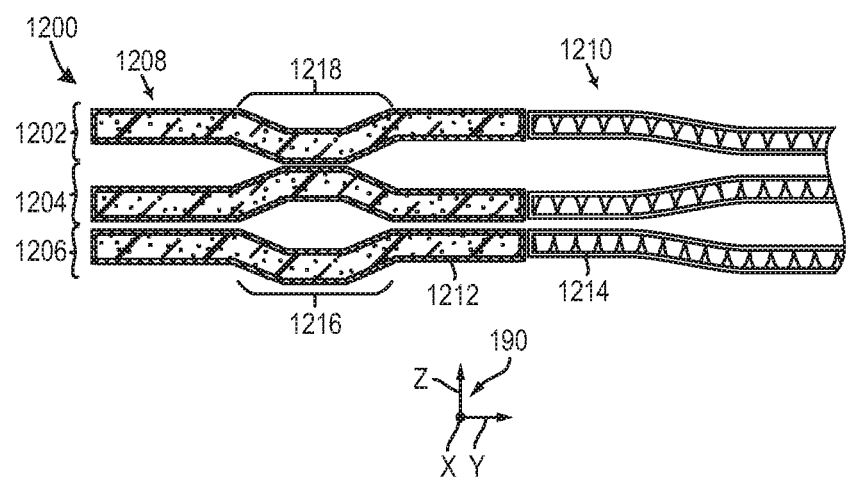

FIG. 12 illustrates another example of a head gasket 1200 without a spacer, but of a three layer design. The gasket 1200 comprises three assemblies: a first assembly 1202; second assembly 1204; and third assembly 1206. Each assembly 1202, 1204, 1206 may have its own combustion sealing section 1208 and fluid sealing section 1210 with the anti-fret coatings 1212 and synthetic rubber coatings 1214, respectively. A lower set of raised beads 1216 is shown extending away from one another and an upper raised bead 1218 extends upward in a direction parallel to the z-axis.

Figure 13:
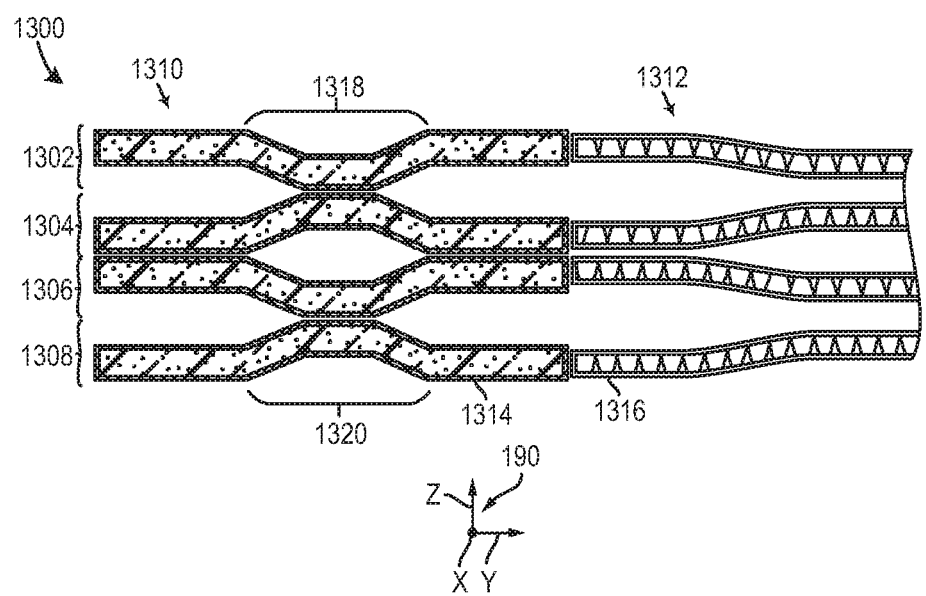

FIG. 13 shows yet another example of a gasket 1300 without a spacer. The gasket comprises four assemblies 1302, 1304, 1306, and 1308. The assemblies again include combustion sealing sections 1310 and fluid sealing sections 1312 with anti-fret coating 1314 and synthetic rubber coatings 1316, respectively. The assemblies 1302, 1304 include beads 1318 extending towards one another and the assemblies 1306, 1308 also include beads 1320 extending toward each other. The gasket 1300 shown in FIG. 13 includes a greater number of layers than some of the other gasket configurations, to provide a gasket that is less susceptible to degradation and leaking which may however increase the manufacturing cost of the gasket.

Figure 14:
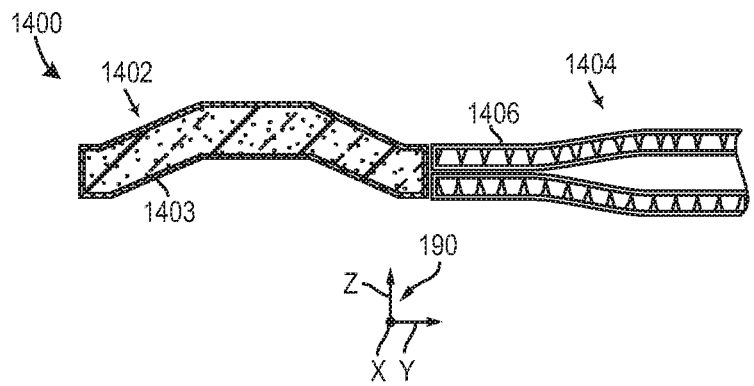

FIG. 14 shows a cross-section of a head gasket 1400 containing a thicker combustion sealing section 1402, in relation to the previous gasket embodiments. An anti-fret coating 1403 is again used in the combustion sealing section 1402. The gasket also includes fluid sealing sections 1404 with synthetic rubber coatings 1406 applied thereto. The thicker combustion sealing section may be used in engines where a slightly lower compression ratio is desired.

Figure 15:
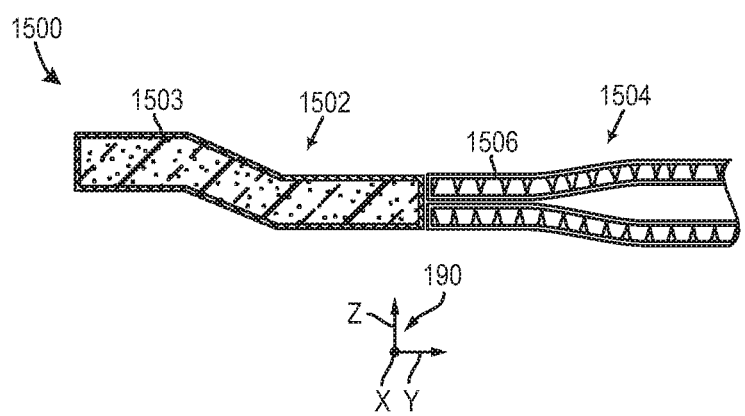

FIG. 15 illustrates a gasket 1500 with one combustion sealing section 1502 having a similar thickness to the combustion sealing section in FIG. 14 and an anti-fret coating 1503 but has an s-shaped profile, which may provide robust sealing in a more spaced constrained engine arrangement. Fluid sealing sections 1504 with synthetic rubber coatings 1506, are again provided.

Figure 16:
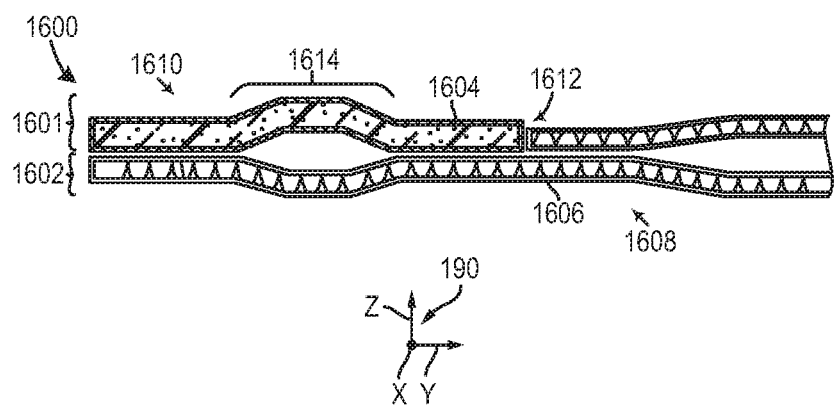

FIG. 16 displays a gasket 1600 without a spacer, but with upper and lower assemblies 1601, 1602 again with anti-fret coating 1604 and a synthetic rubber coating 1606 on different sections. The lower assembly 1602 includes a fluid sealing section 1608 extending below, in relation to the z-axis, a combustion sealing section 1610 of the upper assembly 1601. The gasket 1600 is shown with one stepped interface 1612. However, other arrangements may be utilized, in other examples. A raised bead 1614 in the combustion sealing section 1610 again extends upwardly away from the lower assembly.

Figure 17:
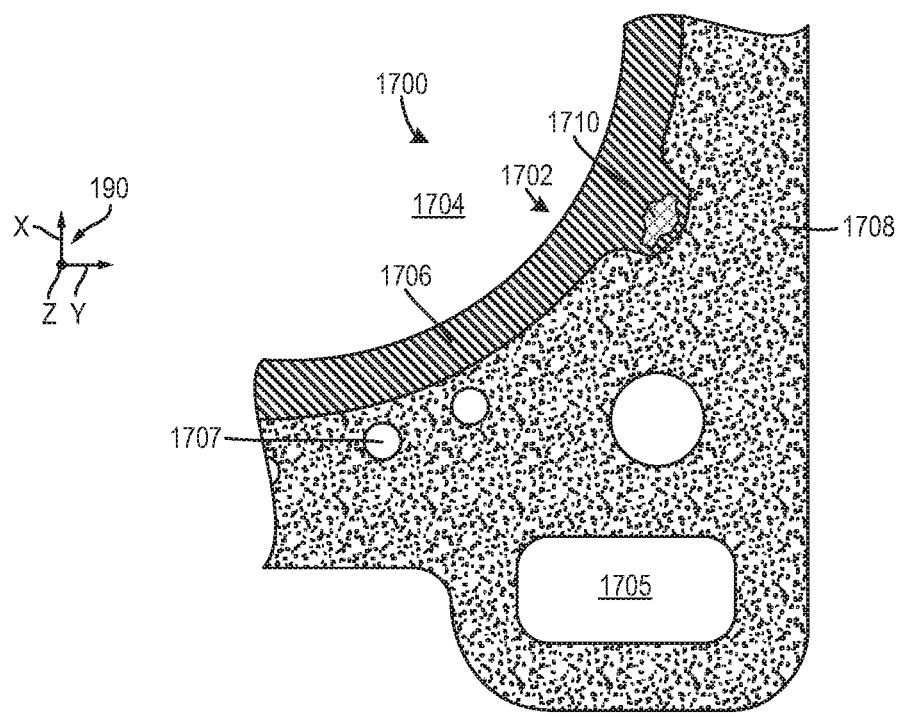
FIGS. 17-18 are illustrations of a segment of a second example of a head gasket.
Figure 18:
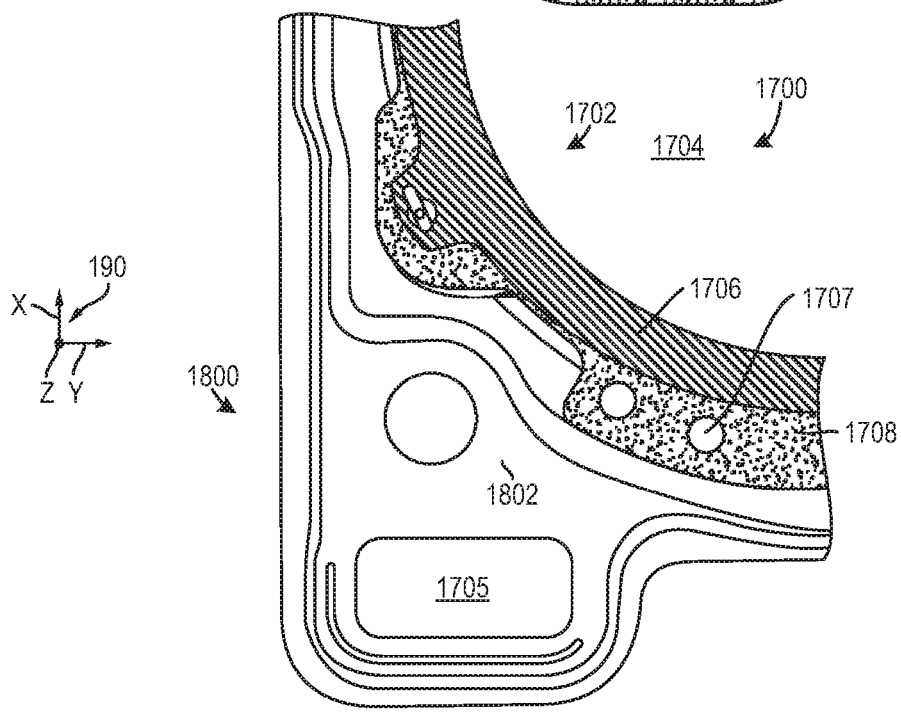

Turning to FIGS. 17 and 18, illustrating two sides of a portion of a head gasket 1700. Each figure shows a combustion sealing section 1702 (e.g., flange) near a cylinder bore 1704 with an anti-fret coating 1706. An oil drain-back passage 1705 is also depicted in FIGS. 17 and 18. The oil drain-back passage routes oil to an oil pan when the gasket is installed in an engine. The gasket 1700 also includes water jacket openings 1707 routing coolant between water jackets in the cylinder block and head. FIG. 17 specifically shows the gasket 1700 with a fluid sealing section removed to reveal a spacer 1708. An eyelet 1710 is also shown attaching the combustion sealing section 1702 to the spacer 1708. However, as previously mentioned gaskets without eyelets have been envisioned. FIG. 18 conversely shows another side of the gasket 1700, with the combustion sealing section 1702 with the anti-fret coating 1706 and a fluid sealing section 1800 with a synthetic rubber coating 1802. The fluid sealing section 1800 is therefore spaced away from the cylinder bore 1704 and is instead located adjacent to the water jacket openings 1707. In this way, the gasket's material construction is tailored to meet durability targets in areas of the gasket experiencing different thermal and kinematic loads.

Figure 19:
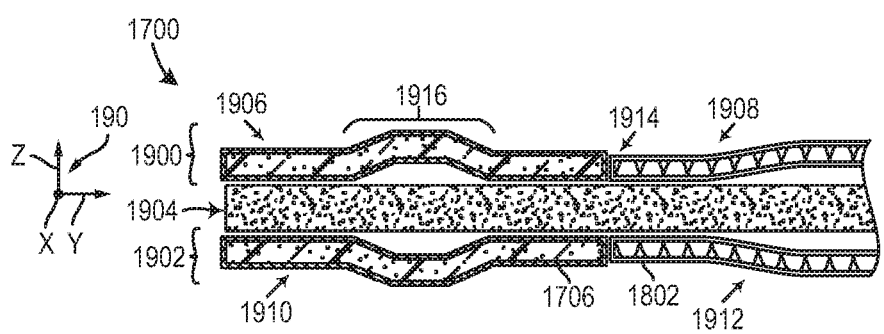
FIG. 19 is a cross-sectional view of the gasket, depicted in FIGS. 17-18.

FIG. 19 shows a cross sectional segment of the head gasket 1700. The gasket 1700 is again partitioned into an upper assembly 1900 and a lower assembly 1902 with a spacer 1904 interposed between the assemblies. The upper assembly 1900 includes a combustion sealing section 1906 and a fluid sealing section 1908 and the lower assembly 1902 likewise includes a combustion sealing section 1910 and a fluid sealing section 1912. The anti-fret coating 1706 and the synthetic rubber coating 1802 are again illustrated along with stepped interfaces 1914 and raised beads 1916 extending away from one another, although other configurations are possible. The tuned material construction of the coatings and the stepped interfaces work in conjunction to provide a more durable gasket with an expanded lifespan, when compared to previous types of gaskets.

FIGS. 1-19 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a gasket is provided that comprises an upper assembly including: an upper combustion sealing section with a raised bead configured to be positioned between a first component and a second component and adjacent to a combustion chamber; and an upper fluid sealing section configured to be positioned between the first component and the second component at a location spaced away from the combustion chamber; wherein the upper combustion sealing section includes an anti-fret coating on a metal layer; wherein the upper fluid sealing section includes a synthetic rubber coating on a metal layer; and wherein the upper combustion sealing section is greater in thickness than the upper fluid sealing section.

In another aspect, a gasket is provided that comprises an upper assembly including: an upper combustion sealing section with a raised bead configured to be positioned between a cylinder head and a cylinder block and adjacent to a combustion chamber; and an upper fluid sealing section positioned between the cylinder head and the cylinder block at a location spaced away from the combustion chamber; wherein the upper combustion sealing section includes an anti-fret coating on a metal layer that does not include a fluoroelastomer material; wherein the upper fluid sealing section includes a fluoroelastomer coating on a metal layer; and wherein the upper combustion sealing section is greater in thickness than the upper fluid sealing section.

In yet another aspect, a gasket is provided that comprises an upper assembly including: an upper combustion sealing section with a raised bead configured to be positioned between a cylinder head and a cylinder block; and an upper fluid sealing section configured to be positioned between the cylinder head and the cylinder block at a location spaced away from a combustion chamber, wherein the combustion chamber is formed by the cylinder head and the cylinder block; wherein the upper combustion sealing section includes an anti-fret coating on a metal layer; wherein the upper fluid sealing section includes a fluoroelastomer or a fluoropolymer coating on a metal layer; wherein the upper combustion sealing section is greater in thickness than the upper fluid sealing section; and wherein a stepped interface is formed at adjoining edges of the upper combustion sealing section and the upper fluid sealing section.

In any of the aspect or combinations of the aspects, a stepped interface may be formed at adjoining edges of the upper combustion sealing section and the upper fluid sealing section.

In any of the aspect or combinations of the aspects, the anti-fret coating may include a plating comprising one or more of nickel and polytetrafluoroethylene (PTFE).

In any of the aspect or combinations of the aspects, the anti-fret coating may include a ceramic material with one or more of a molybdenum disulfide additive, a boron additive, and a polytetrafluoroethylene (PTFE) additive.

In any of the aspect or combinations of the aspects, the anti-fret coating may include a polymer with one or more of a molybdenum disulfide additive, a boron additive, and a polytetrafluoroethylene (PTFE) additive and the synthetic rubber coating may include a fluoroelastomer material.

In any of the aspect or combinations of the aspects, the gasket may further comprise of a lower assembly containing a lower combustion sealing section with a raised bead configured to be positioned between the first component and the second component and adjacent to the combustion chamber; and a lower fluid sealing section configured to be positioned between the first component and the second component at a location spaced away from the combustion chamber; wherein the lower combustion sealing section may include an anti-fret coating on a metal layer; wherein the lower fluid sealing section may include a synthetic rubber coating on a metal layer; and wherein the lower combustion sealing section may be greater in thickness than the lower fluid sealing section; and wherein a spacer may be positioned vertically between the upper combustion sealing section and the lower combustion sealing section and the upper fluid sealing section and the lower fluid sealing section.

In any of the aspect or combinations of the aspects, the raised beads in the upper and lower combustion sealing sections may extend away from one another.

In any of the aspect or combinations of the aspects, the raised beads in the upper and lower combustion sealing sections may extend toward one another.

In any of the aspect or combinations of the aspects, the upper fluid sealing section may include a raised segment.

In any of the aspect or combinations of the aspects, a stepped interface may be formed at adjoining edges of the upper combustion sealing section and the upper fluid sealing section.

In any of the aspect or combinations of the aspects, the anti-fret coating may be a plating with one or more of nickel and polytetrafluoroethylene (PTFE).

In any of the aspect or combinations of the aspects, the anti-fret coating may include a polymer with one or more of a molybdenum disulfide additive, a boron additive, and a polytetrafluoroethylene (PTFE) additive.

In any of the aspect or combinations of the aspects, the anti-fret coating may include a ceramic material with one or more of a molybdenum disulfide additive, a boron additive, and polytetrafluoroethylene (PTFE) additive.

In any the aspect or combinations of the aspects, the gasket may further comprise of a lower assembly containing a lower combustion sealing section with a raised bead configured to be positioned between the cylinder head and the cylinder block and adjacent to the combustion chamber; a lower fluid sealing section configured to be positioned between the cylinder head and the cylinder block at a location spaced away from the combustion chamber; wherein the lower combustion sealing section includes an anti-fret coating on a metal layer that does not include a fluoroelastomer material; wherein the lower combustion sealing section may include a synthetic rubber coating on a metal layer; and wherein the lower combustion sealing section may be greater in thickness than the lower fluid sealing section; and a spacer positioned vertically between the upper combustion sealing section and the lower combustion sealing section and the upper fluid sealing section and the lower fluid sealing section.

In any of the aspect or combinations of the aspects, the anti-fret coating may include a plating with one or more of nickel and polytetrafluoroethylene (PTFE).

In any of the aspect or combinations of the aspects, the anti-fret coating may include a ceramic material with one or more of a molybdenum disulfide additive and a boron additive.

In any of the aspect or combinations of the aspects, the anti-fret coating may include a polymer with one or more of a molybdenum disulfide additive, a boron additive, and a polytetrafluoroethylene (PTFE) additive.

In another representation, an engine head gasket is provided that comprises a higher durability coating near cylinder bore openings and a lower durability coating recess from the cylinder bore openings, wherein the higher durability coating includes multilayered steel with a nickel deposition thereon and where the lower durability coating may include a fluoroelastomeric material.

As used herein, the terms "substantially" and "approximately" are construed to mean plus or minus five percent of the range unless otherwise specified.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. It will be appreciated that the configurations disclosed herein are exemplary in nature, and that these specific examples are not to be considered in a limiting sense, because numerous variations are possible. For example, the above technology can be applied to a variety of gaskets. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A gasket comprising:
an upper assembly including:
  an upper combustion sealing section with a raised bead configured to:
    be positioned between a first component and a second component and adjacent to a combustion chamber; and
    contact the first component; and
  an upper fluid sealing section configured to be positioned between the first component and the second component at a location spaced away from the combustion chamber;
  wherein the upper combustion sealing section includes an anti-fret coating on a metal layer;
  wherein the upper fluid sealing section includes a synthetic rubber coating on a metal layer;
  wherein the upper combustion sealing section is greater in thickness than the upper fluid sealing section;
  wherein a stepped interface is formed at adjoining edges of the upper combustion sealing section and the upper fluid sealing section;
  wherein the adjoining edges are parallel to a vertical axis and are include side surfaces that are adjacent to one another; and
  wherein the upper fluid sealing section is constructed out of a different material than the upper combustion sealing section.

2. The gasket of claim 1, wherein the upper fluid sealing section and the upper combustion sealing section do not overlap with respect to an axis that is parallel to a central axis of the combustion chamber.

3. The gasket of claim 1, wherein the anti-fret coating includes a plating comprising one or more of nickel and polytetrafluoroethylene (PTFE).

4. The gasket of claim 1, wherein the anti-fret coating includes a ceramic material with one or more of a molybdenum disulfide additive, a boron additive, and a polytetrafluoroethylene (PTFE) additive.

5. The gasket of claim 1, wherein the anti-fret coating includes a polymer with one or more of a molybdenum disulfide additive, a boron additive, and a polytetrafluoroethylene (PTFE) additive and the synthetic rubber coating includes a fluoroelastomer material.

6. The gasket of claim 1, further comprising a lower assembly comprising:
  a lower combustion sealing section with a raised bead configured to be positioned between the first component and the second component and adjacent to the combustion chamber; and
  a lower fluid sealing section configured to be positioned between the first component and the second component at a location spaced away from the combustion chamber;
  wherein the lower combustion sealing section includes an anti-fret coating on a metal layer;
  wherein the lower fluid sealing section includes a synthetic rubber coating on a metal layer; and
  wherein the lower combustion sealing section is greater in thickness than the lower fluid sealing section.

7. The gasket of claim 6, further comprising a spacer positioned vertically between the upper combustion sealing section and the lower combustion sealing section and the upper fluid sealing section and the lower fluid sealing section.

8. The gasket of claim 6, wherein the raised beads in the upper and lower combustion sealing sections extend away from one another.

9. The gasket of claim 6, wherein the raised beads in the upper and lower combustion sealing sections extend toward one another.

10. The gasket of claim 1, wherein the upper fluid sealing section includes a raised segment.

11. A gasket comprising:
  an upper assembly including:
    an upper combustion sealing section with a raised bead configured to be positioned between a cylinder head and a cylinder block and adjacent to a combustion chamber; and
    an upper fluid sealing section positioned between the cylinder head and the cylinder block at a location spaced away from the combustion chamber;
    wherein the upper combustion sealing section includes an anti-fret coating on a metal layer that does not include a fluoroelastomer material;
    wherein the upper fluid sealing section includes a fluoroelastomer coating on a metal layer; and
    wherein the upper combustion sealing section is greater in thickness than the upper fluid sealing section;
  a lower assembly comprising:
    a lower combustion sealing section with a raised bead configured to be positioned between the cylinder head and the cylinder block and adjacent to the combustion chamber; and
    a lower fluid sealing section configured to be positioned between the cylinder head and the cylinder block at a location spaced away from the combustion chamber;
  wherein the upper and lower fluid sealing sections are constructed out of a different material than the upper and lower combustion sealing sections; and
  wherein the upper fluid sealing section and the upper combustion sealing section do not overlap with respect to an axis that is parallel to a central axis of the combustion chamber.

12. The gasket of claim 11, wherein a stepped interface is formed at adjoining edges of the upper combustion sealing section and the upper fluid sealing section.

13. The gasket of claim 11, wherein the anti-fret coating is a plating with one or more of nickel and polytetrafluoroethylene (PTFE).

14. The gasket of claim 11, wherein the anti-fret coating includes a polymer with one or more of a molybdenum disulfide additive, a boron additive, and a polytetrafluoroethylene (PTFE) additive.

15. The gasket of claim 11, wherein the anti-fret coating includes a ceramic material with one or more of a molybdenum disulfide additive, a boron additive, and polytetrafluoroethylene (PTFE) additive.

16. The gasket of claim 11, wherein the lower assembly comprises:
  a spacer positioned vertically between the upper combustion sealing section and the lower combustion sealing section and the upper fluid sealing section and the lower fluid sealing section.

17. A head gasket for an engine, comprising:
  an upper assembly including:
    an upper combustion sealing section with a raised bead configured to be positioned between a cylinder head and a cylinder block; and
    an upper fluid sealing section configured to be positioned between the cylinder head and the cylinder block at a location spaced away from a combustion chamber, wherein the combustion chamber is formed by the cylinder head and the cylinder block;
  a lower assembly comprising:
    a lower combustion sealing section with a raised bead configured to be positioned between the cylinder head and the cylinder block and adjacent to the combustion chamber; and
    a lower fluid sealing section configured to be positioned between the cylinder head and the cylinder block at a location spaced away from the combustion chamber;
  wherein the upper and lower fluid sealing sections are constructed out of a different material than the upper and lower combustion sealing sections;
  wherein the upper fluid sealing section and the upper combustion sealing section do not overlap with respect to an axis that is parallel to a central axis of the combustion chamber;
  wherein the upper and lower combustion sealing sections each include an anti-fret coating on a metal layer;
  wherein the upper and lower fluid sealing sections each include a fluoroelastomer or a fluoropolymer coating on a metal layer;
  wherein the upper combustion sealing section is greater in thickness than the upper fluid sealing section; and
  wherein a stepped interface is formed at adjoining edges of the upper combustion sealing section and the upper fluid sealing section.

18. The head gasket of claim 17, wherein the anti-fret coating includes a plating with one or more of nickel and polytetrafluoroethylene (PTFE).

19. The head gasket of claim 18, wherein the anti-fret coating includes a ceramic material with one or more of a molybdenum disulfide additive and a boron additive.

20. The head gasket of claim 17, wherein the anti-fret coating includes a polymer with one or more of a molybdenum disulfide additive, a boron additive, and a polytetrafluoroethylene (PTFE) additive.

* * * * *